United States Patent
Cialini et al.

(10) Patent No.: US 7,680,771 B2
(45) Date of Patent: Mar. 16, 2010

(54) APPARATUS, SYSTEM, AND METHOD FOR DATABASE PROVISIONING

(75) Inventors: Enzo Cialini, Mississauga (CA); Laura Myers Haas, San Jose, CA (US); Balakrishna Raghavendra Iyer, San Jose, CA (US); Allen William Luniewski, Cupertino, CA (US); Jayashree Subrahmonia, San Jose, CA (US); Noshir Cavas Wadia, Morgan Hill, CA (US); Hansjorg Zeller, Los Altos, CA (US)

(73) Assignee: International Business Machines Corporation, Armonk, NY (US)

(*) Notice: Subject to any disclaimer, the term of this patent is extended or adjusted under 35 U.S.C. 154(b) by 463 days.

(21) Appl. No.: 11/017,490

(22) Filed: Dec. 20, 2004

(65) Prior Publication Data

US 2006/0136448 A1    Jun. 22, 2006

(51) Int. Cl.
G06F 7/00 (2006.01)
G06F 17/00 (2006.01)
G06F 17/30 (2006.01)

(52) U.S. Cl. .................. 707/3; 707/10; 707/100

(58) Field of Classification Search .......... 707/3–4, 707/5
See application file for complete search history.

(56) References Cited

U.S. PATENT DOCUMENTS

| | | | |
|---|---|---|---|
| 5,890,156 A * | 3/1999 | Rekieta et al. ............. 707/10 |
| 6,473,750 B1 * | 10/2002 | Petculescu et al. ......... 707/3 |
| 6,714,980 B1 | 3/2004 | Markson et al. ........... 709/226 |
| 6,779,016 B1 | 8/2004 | Aziz et al. ................. 709/201 |
| 7,194,451 B2 * | 3/2007 | Chaudhuri et al. ......... 707/2 |
| 7,483,918 B2 * | 1/2009 | Chaudhuri et al. ........ 707/104.1 |
| 7,529,196 B2 * | 5/2009 | Basu et al. ................ 370/254 |
| 2002/0194015 A1 | 12/2002 | Gordon et al. ............ 705/1 |
| 2003/0212673 A1 * | 11/2003 | Kadayam et al. .......... 707/3 |
| 2004/0103195 A1 | 5/2004 | Chalasani et al. ......... 709/226 |
| 2004/0103338 A1 | 5/2004 | Chalasani et al. ......... 714/4 |
| 2004/0215626 A1 * | 10/2004 | Colossi et al. ........... 707/100 |
| 2004/0249810 A1 * | 12/2004 | Das et al. ................ 707/5 |
| 2005/0131872 A1 * | 6/2005 | Calbucci et al. .......... 707/3 |
| 2005/0149496 A1 * | 7/2005 | Mukherjee et al. ........ 707/3 |
| 2005/0192921 A1 * | 9/2005 | Chaudhuri et al. ........ 707/1 |
| 2005/0192937 A1 * | 9/2005 | Barsness et al. .......... 707/3 |
| 2005/0203887 A1 * | 9/2005 | Joshi et al. .............. 707/3 |

(Continued)

OTHER PUBLICATIONS

David G. Cameron et al., "Evaluating Scheduling and Replica Optimisation Strategies in OptorSim", Published 2003 IEEE Computer Society.*

(Continued)

*Primary Examiner*—Mohammad Ali
*Assistant Examiner*—Patrick A Darno
(74) *Attorney, Agent, or Firm*—Kunzler & McKenzie (57) ABSTRACT

An apparatus, system, and method are disclosed for provisioning database resource within a grid database system. The apparatus comprises an analysis module and a provision module. The analysis module analyzes a data query stream from an application to a database instance and determines that the data query stream exhibits a predetermined performance attribute. The provision module provisions a database resource in response to a determination that the data query stream exhibits the predetermined performance attribute. The provisioned database resource may be a database instance, a database server, or a cache. The provisioning of the new database resource advantageously is substantially transparent to a client on the database system.

16 Claims, 8 Drawing Sheets

U.S. PATENT DOCUMENTS

2005/0278290 A1* 12/2005 Bruce et al. ............... 707/1
2006/0036989 A1* 2/2006 Chaudhuri et al. .......... 717/101
2006/0294038 A1* 12/2006 Grossfeld et al. .............. 707/1

OTHER PUBLICATIONS

David G. Cameron et al., "Evaluating Scheduling and Replica Optimisation Strategies in OptorSim", Published 2003, IEEE Computer Society.*

Cialini et al., "Overview of IBM DB2 Universal Database Using the IBM TotalStorage SAN File System" IBM Nov. 14, 2003 pp. 1-20.

Monty Wright, "An overview of high availability and disaster recovery for DB2 UDB", http://www.106.ibm.com/developerworks/db2/library/techarticle/0304wright/0304wright... Apr. 10, 2003 pp. 1-12.

Shahed Quezi, "Split Mirror using Suspended I/O in IBM DB2 universal database version 7", http:www-106.ibm.com/developerworks/db2/library/techarticle/0204quazi/0204quzai.html, Apr. 2002, pp. 1-9.

Baris Naciterhan, "Open Source linux high Availability for IBM DB2 Universal Database", DB2 Information management Software, Sep. 2003.

Ranganathan, et al., "Improving data availability through dynamic model-driven replication in large peer-to-peer communities", Department of Computer Science, The University of Chicago, 2002 IEEE.

Shen et al., "MS-I/O: A distributed multi-storage I/O System", Center for Parallel and Distributed Computing Department of Electrical and Computer Engineering, NorthWestern University, 2002 IEEE.

Cameron, et al., "Evaluating Scheduling and Replica optimisation strategies in optorsim", University of Glasgow, 2003 IEEE.

Lamehamedi, et al., "Data replication strategies in grid environments", Department of Computer Science, Information Sciences Institute, 2002 IEEE.

Cheung et al., "The Grid Protocol: A high performance scheme for maintaining replicated data"1992 IEEE.

Stockinger, et al. "File and Object Replication in Data Grids", 2001 IEEE.

Bell, et al. "Evaluation of an economy-based file replication strategy for a data grid", 2003 IEEE.

Lee et al., "Dynamic replica management in the service grid", Department of Computer Science and Engineering, University of Minnesota, 2001 IEEE; pp. 433-434.

Sudharshan Vazhkudai, "Enabling the Co-Allocation of grid data transfers", Department of Computer Sciences, University of Mississippi, 2003 IEEE.

Akhil Kumar, "An efficient supergrid protocol for high availability and load balancing", IEEE computer Society, 2000.

"IBM TotalStorage SAN Volume Controller, Planning Guide", Version 1.2.0, Apr. 2004, pp. 1-102.

"IBM TotalStorage SAN Volume Controller, Command-Line Interface User's Guide", Version 1.1.1 Nov. 2003, pp. 1-378.

* cited by examiner

FIG. 1

(Prior Art)

APPARATUS, SYSTEM, AND METHOD FOR DATABASE PROVISIONING

BACKGROUND OF THE INVENTION

1. Field of the Invention

This invention relates to databases and more particularly relates to provisioning database resources on a grid computing system.

2. Description of the Related Art

Grid computing takes advantage of the combined processing power of several computers that are loosely coupled to share processing cycles to execute shared operations or portions of an overall operation. By employing grid computing, complex operations may be executed that might overwhelm a single computer. From another perspective, grid computing allows several users to more efficiently use the resources of a fewer number of machines.

One application for grid computing is apparent in the shared access by disparate entities to a central or distributed data storage system. For example, a storage area network (SAN) having a plurality of data storage devices may be used by one company during the day and by another company during the night. In this way, one company may back up its data, for example, during the off hours of the night and another company can back up its data during a slow time during the day. This implementation may be especially useful where the companies have different operating needs, for example, where one company is in the United States and the other company is in India.

Figure 1:
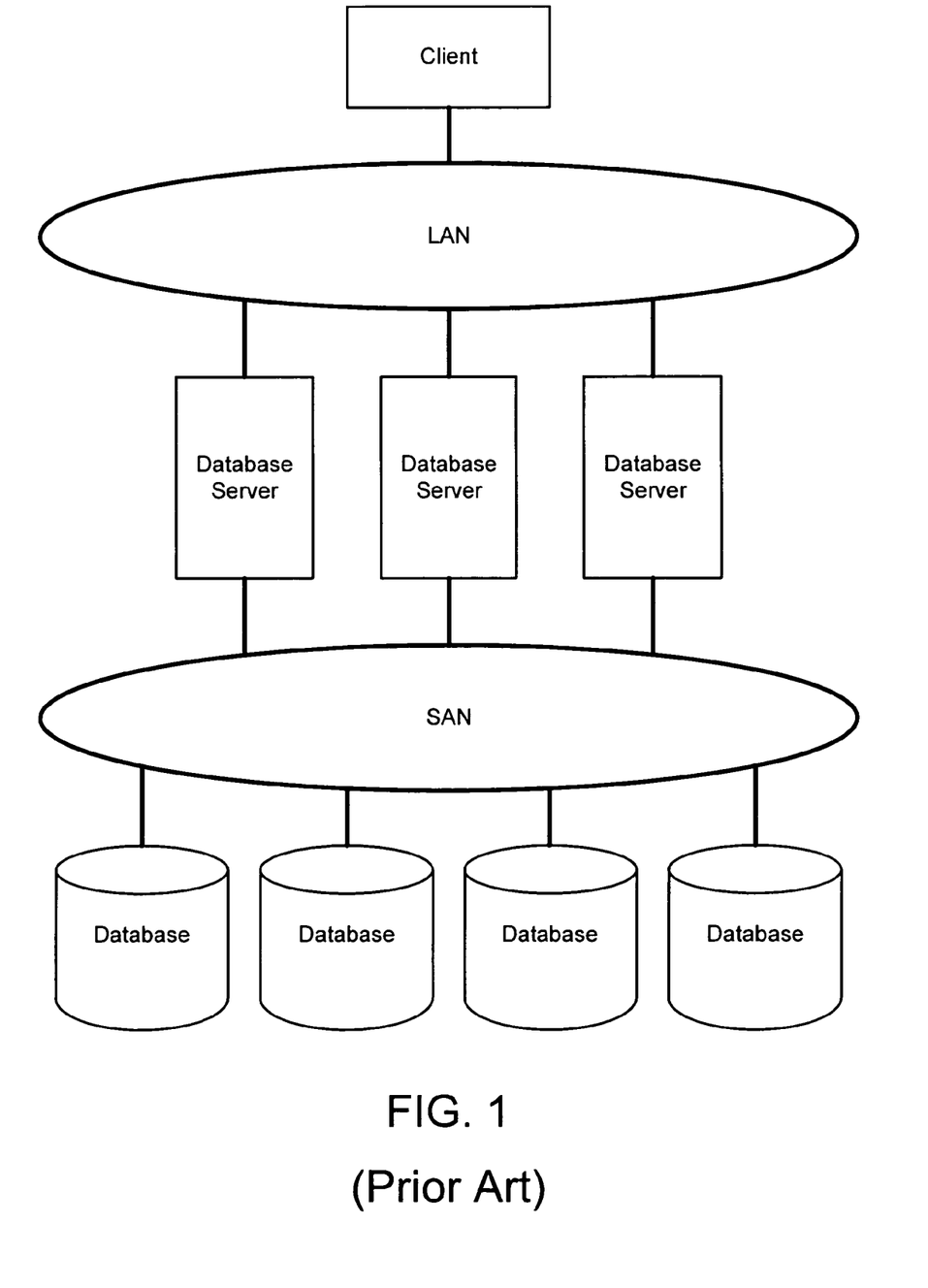
FIG. 1 is a schematic block diagram illustrating a database system.

FIG. 1 shows a database system. The illustrated database system includes a client that is connected to several database servers, which are connected to several databases via a SAN. The databases are physically stored on storage media, such as magnetic disks in the SAN. The database servers (also referred to as database managers and/or database instances) are logical representations of one or more of the databases. A database instance also may include other data and metadata that may be useful in operating the database. For example, the database instance may include some or all of the following information: a database name, volumes, files, and metadata, including configuration files, database parameters, and paths to the volumes.

One database instance may facilitate client access to one or more databases. However, when the workload on the database instance increases, conventional technology may not allow an alternative way to access the data more effectively within the database. In other words, the database server may become overloaded and the potential performance of the grid may be diminished.

In order to implement an efficient grid computing system, the grid system should be designed to accommodate increased or decreased load demands. The grid system should also be designed to balance the loads on the system among the multiple computers within the system. Unfortunately, conventional technology fails to demonstrate adequate workload balancing and resource provisioning within a grid computing system. Additionally, conventional database technologies for grid computing are rather limited. Although some conventional technologies attempt to transfer a database from one instance to another upon failure of a database manager, conventional technology does not provide for resource provisioning to increase the performance of the database system.

From the foregoing discussion, it should be apparent that a need exists for an apparatus, system, and method that provision database resources in response to performance of the database system. Beneficially, such an apparatus, system, and method would additionally overcome the performance limitations of conventional database systems and would cause less disruption (outages) than a failover mechanism.

SUMMARY OF THE INVENTION

From the foregoing discussion, it should be apparent that a need exists for an apparatus, system, and method that provisions database resources in response to performance of the database system. Beneficially, such an apparatus, system, and method would additionally overcome the performance limitations of conventional database systems.

The several embodiments of the present invention have been developed in response to the present state of the art, and in particular, in response to the problems and needs in the art that have not yet been fully solved by currently available database systems. Accordingly, the present invention has been developed to provide an apparatus, system, and method for provisioning database resources that overcome many or all of the above-discussed shortcomings in the art.

In one embodiment, the analysis module analyzes a data query stream from a client to a database instance. The analysis module also determines if the data query stream exhibits a predetermined performance attribute. The predetermined performance attribute may be any type of performance attribute that defines the performance of the database instance or a corresponding database, such as workload balance, network delay, failure, query throughput, and so forth.

In one embodiment, the provision module provisions a database resource in response to a determination that the data query stream exhibits a given performance attribute. The provisioned database resource may be a database instance, a cache, or another database resource.

In one embodiment, the query module redirects a data query within a data query stream to the provisioned database resource. In one embodiment, the move module transfers an entire database from a first database instance to another database instance. Alternatively, the move module may transfer a portion of a database. In one embodiment, the cache module determines which data within a database might be replicated on a provisioned database resource, such as a cache. In one embodiment, the replication module copies the specified data from the database to the cache. The replication module also may ensure that the data on the cache is updated periodically or when the data in the back end database is updated. In one embodiment, the queue module queues a data query from the data query stream approximately during the time that the new database resource is provisioned and initialized. In one embodiment, the patrol module captures a copy of every data query in the data query stream.

A system of the present invention is also presented to provision database resources. The system may be embodied in a database system having one or more clients, one or more database servers, one or more databases, and a federation apparatus, as described above. The system also may include a storage area network (SAN) and/or other networking and communication subsystems to couple together the client(s), database(s), server(s), and federation apparatus.

A signal bearing medium is also presented to store a program that, when executed, performs operations to provision database resources. In one embodiment, the operations include analyzing a data query stream from an application to a database instance, determining if the data query stream exhibits a predetermined performance attribute, and provisioning a database resource in response to a determination that the data query stream exhibits the predetermined performance attribute.

In further embodiments, the operations may include redirecting a data query from the data query stream to the provisioned database resource, transferring an entire database from the database instance to the provisioned database resource, and/or provisioning a new database instance. In further embodiments, the operations may include replicating a portion of a database, from the database instance, on the provisioned database resource, provisioning a cache, updating the replicated data in the cache in response to an update to the database, and/or determining the portion of the database to be replicated on the provisioned database resource. In further embodiments, the operations may include provisioning the database resource locally to the federation apparatus, provisioning the database resource remotely from the federation apparatus, and/or queuing a data query from the data query stream approximately while the provision module provisions the database resource Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable a) form and organized within any suitable type of data structure. The operational data may be collected as a single data set, or may be distributed over different locations including over different storage devices, and may exist, at least partially, merely as electronic signals on a system or network.

Figure 2:
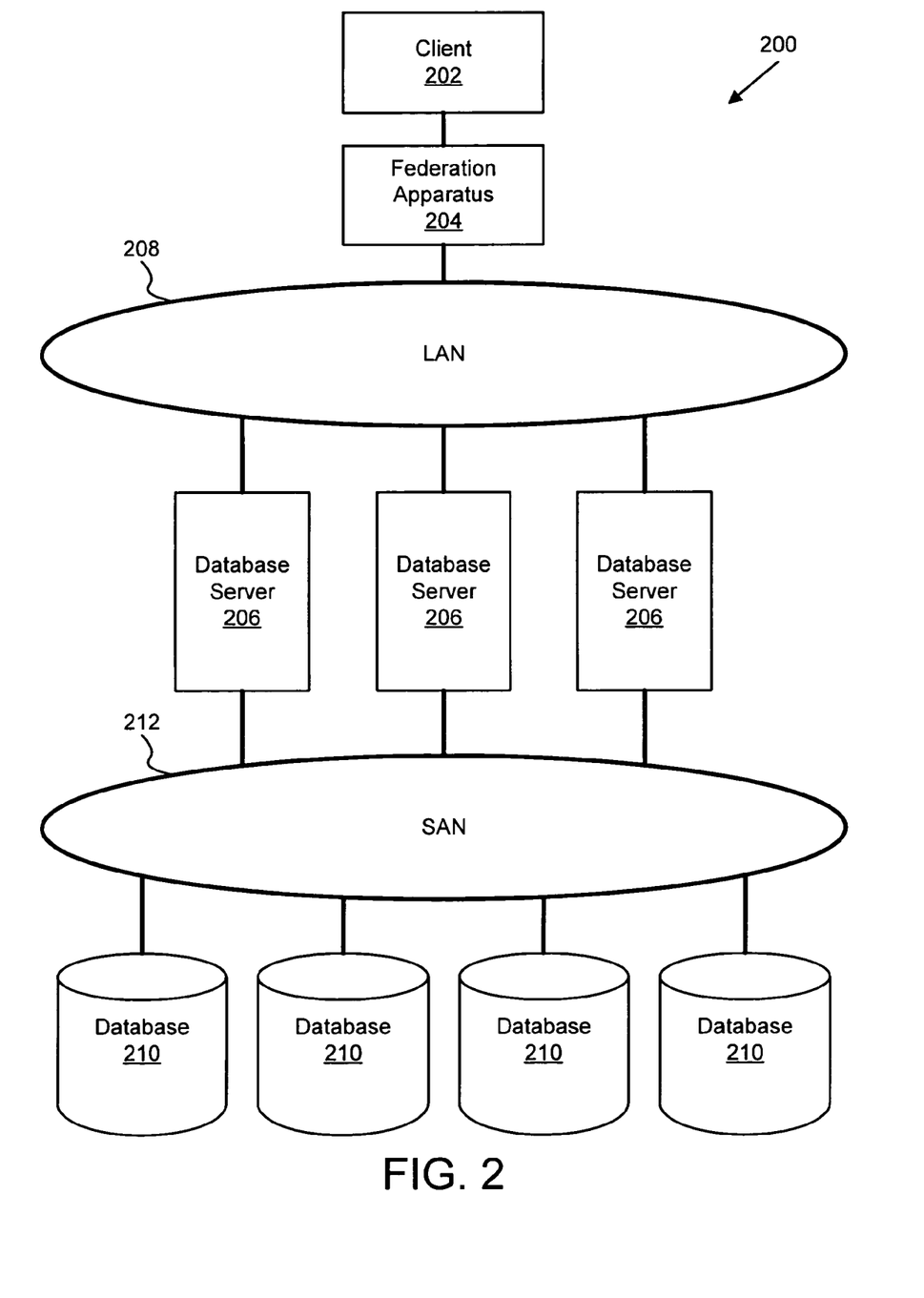
FIG. 2 is a schematic block diagram illustrating one embodiment of a database system to provision database resources.

FIG. 2 depicts one embodiment of a database system 200 to provision database resources. The illustrated database system 200 includes a client 202 that is coupled to a federation apparatus 204. The federation apparatus 204, in turn, is coupled to a plurality of database servers 206 via a local area network (LAN) 208. Alternatively, the federation apparatus 204 may be coupled to the database servers 206 via another type of communication channel or network.

The database servers 206 are coupled to a plurality of databases 210 that are physically stored on electronic storage media. Each database 210 may be stored on a single electronic storage device or may be distributed over a plurality of electronic storage devices. The electronic storage media may be magnetic disks, optical disks, magnetic tape, or another type of data storage device. In one embodiment, the database servers 206 are connected to the databases 210 via a storage area network (SAN) 212. The SAN 212 provides shared access to the several databases 210 stored on the electronic storage media connected to the SAN 212. Alternatively, the database servers 206 may be coupled to the databases 210 via another type of communication channel or network. For example, in one embodiment, a database 210 may be stored locally on a database server 206 and coupled via a bus within the database server 206.

The database servers 206 also may be referred to as database managers, database manager instances, or simply database instances. The database servers 206 are logical representations of one or more of the databases 210. Additionally, the database server 206 may include other data and/or metadata that may be useful in operating a database 210. For example, the database server 206 may include some or all of the following information: a database name, volumes, files, and metadata, including configuration files, database parameters, and paths to the volumes. A single database server 206 may facilitate client access to one or more of the databases 210. Furthermore, a data server 206 may facilitate client access to a portion of one of the databases 210.

During operation of the database system 200, it may be useful for the client 202 to access information in a database 210 through various path configurations. In the depicted embodiment, the client 202 may access database information through a single database server 206. Alternatively, the client 202 may access database information by moving the logical instance of the database 210 to another existing or new database server 206. One example of a database move operation is described in more detail with reference to FIG. 3. In another embodiment, the client 202 may access database information by copying or moving some or all of the physical data within the database 210 to another storage location on the same storage device or on another storage device. One example of a database cache operation is described in more detail with reference to FIG. 4.

Figure 3:
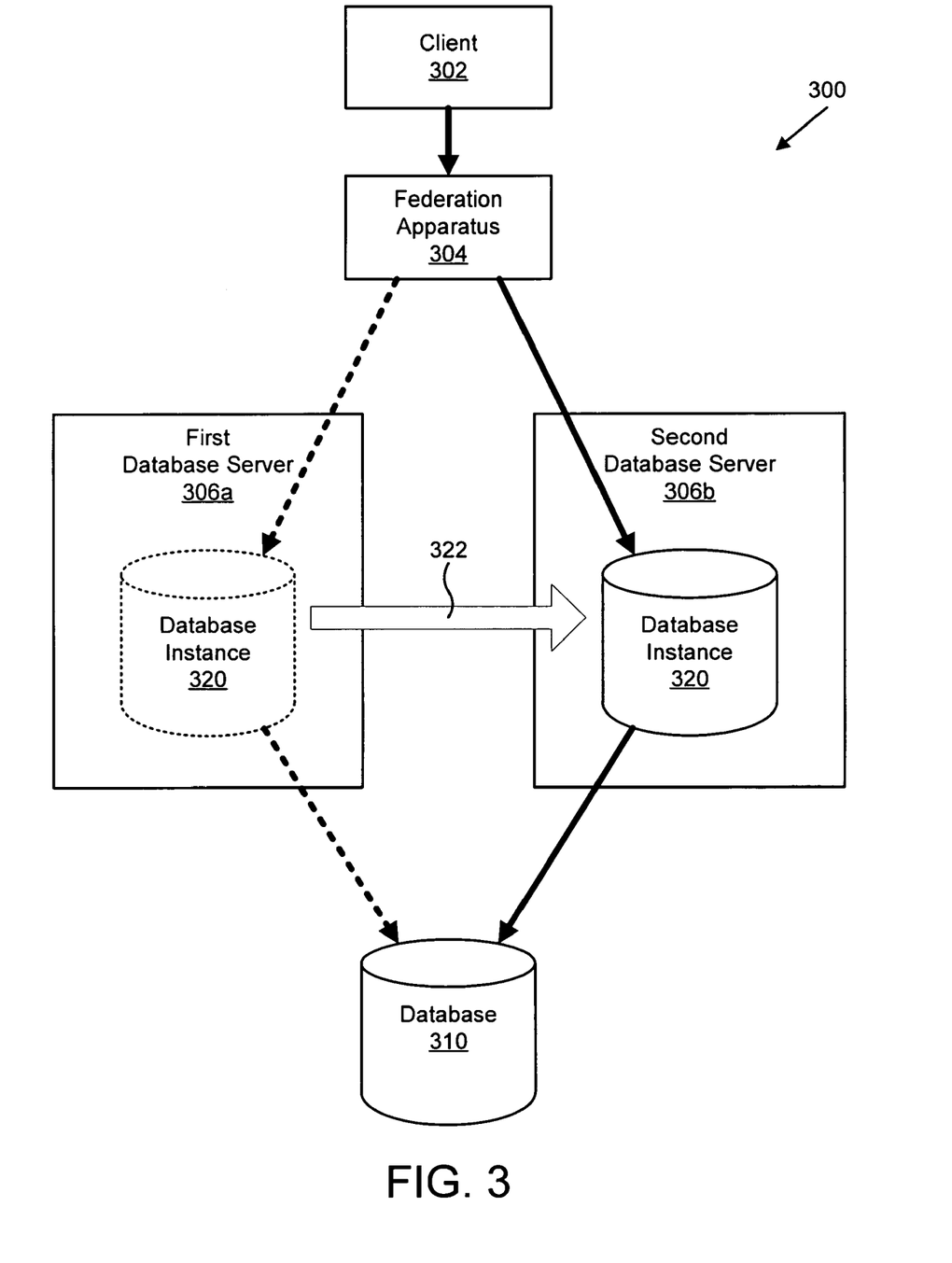
FIG. 3 is a schematic block diagram illustrating one embodiment of a database move operation.

FIG. 3 depicts one embodiment of a database move operation 300. The database move operation 300 is described with reference to a client 302, a federation apparatus 304, database servers 306, and a database 310 that are substantially similar to the client 202, federation apparatus 204, database servers 206, and databases 210, respectively, of FIG. 2. Devices corresponding to other components of the database system 200 have been omitted for clarity. The illustrated database move operation 300 is exemplary of how the federation apparatus 304 may provision a second database server 306 and move the logical instance 320 of the database 310 from a first database server 306a to the second database server 306a.

Prior to provisioning the second database server 306b, the client 302 accesses the database 310 via the database instance 320 on the first database server 306a (shown by the dashed arrows). As described above, the database servers 306 may also service other database instances on the same database server 306s. In response to a trigger event, such as failure or overloading of the first database server 306a, the federation apparatus 304 may move 322 the database instance 320 from the first database server 306a to the second database server 306b. After moving the database instance 320, the client 302 may access the database 310 via the database instance 320 on the second database server 306b (shown by the solid arrows). The client 302 may continue to access other databases (not shown) via the first database server 306a, but accesses the moved database 310 via the second database server 306b.

In another embodiment, the second database server 306b may already exist and service other database instances 320 before the federation apparatus 304 moves 322 the database instance 320 from the first database server 306a to the second database server 306b. In a further embodiment, the federation apparatus 304 may move a selected portion of the database instance 320 from the first database server 306a to the second database server 306b. For example, the federation apparatus 304 may move certain indexes, tables, or subsets of rows and columns from a given table from the first database server 306a to the second database server 306b.

Figure 4:
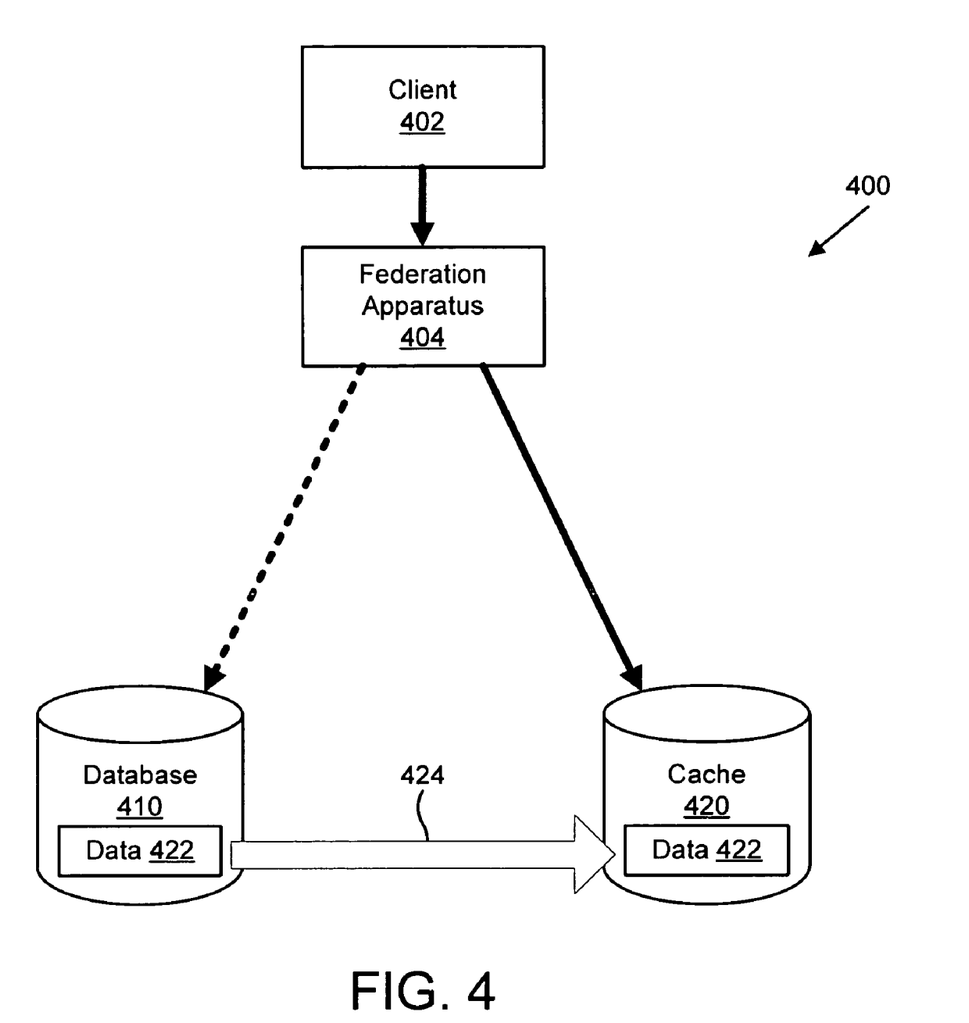
FIG. 4 is a schematic block diagram illustrating one embodiment of a database cache operation.

FIG. 4 depicts one embodiment of a database cache operation 400. The database cache operation 400 is described with reference to a client 402, a federation apparatus 404, and a database 410 that are substantially similar to the client 202, federation apparatus 204, and databases 210, respectively, of FIG. 2. Devices corresponding to other components of the database system 200 have been omitted for clarity. The illustrated database cache operation 400 is exemplary of how the federation apparatus 404 may provision a cache 420 and copy all or part of the database 410 to the cache 420.

Prior to provisioning the cache 420, the client 402 accesses the data 422 in the database 410 (shown by the dashed lines). As described above, the client 402 may access the database 410 via a database server (not shown). In response to a trigger event, such as failure or frequent access of particular data in the database 410, the federation apparatus 404 may copy 424 all or part of the data 422 in the database 410 to the cache 420. After caching the data 422 in the cache 420, the client 302 may access the data in the cache 420 (shown by the solid arrows). The client 402 may continue to access other non-cached data in the database 410, but accesses the cached data 422 in the cache 420. To provide for data integrity, the data 422 in the cache 420 may be periodically updated to correspond to the source data 422 in the database 410. Other caching and updating schemes may be employed to maintain the data 422 in the cache 420.

Figure 5:
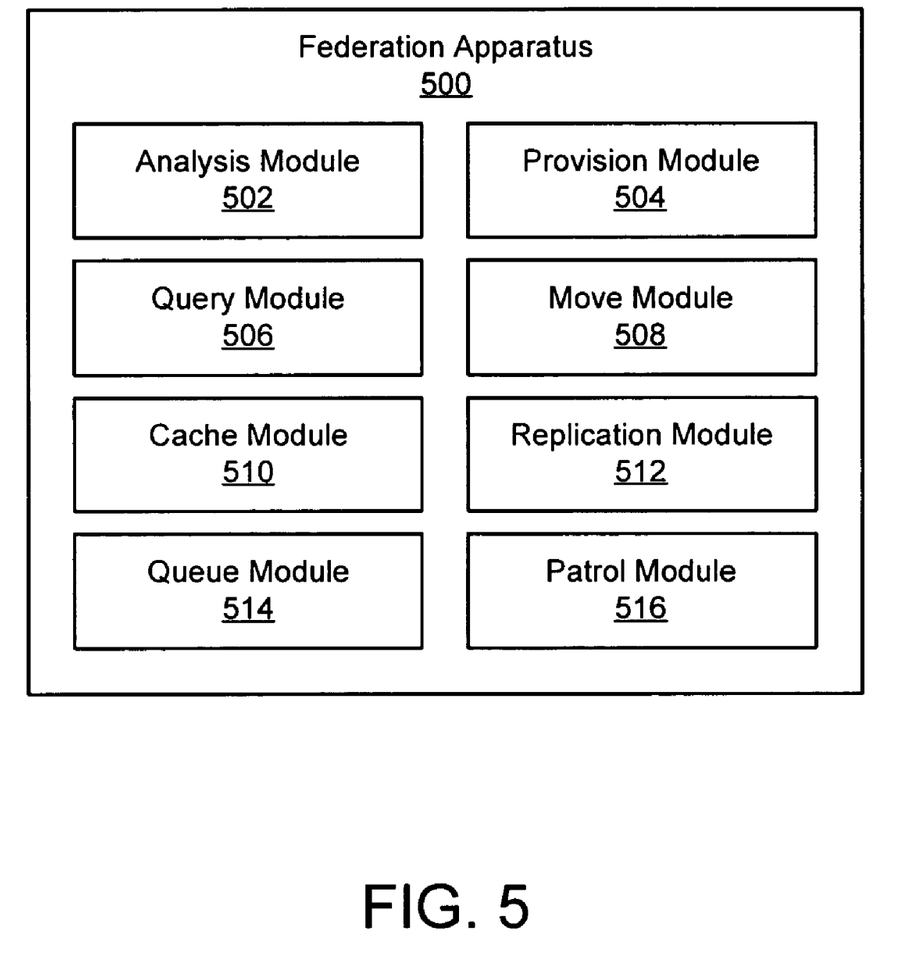
FIG. 5 is a schematic flow chart diagram illustrating one embodiment of a federation apparatus.

FIG. 5 depicts one embodiment of a federation apparatus 500 that is substantially similar to the federation apparatus 200 of the database system 200. The illustrated federation apparatus 500 includes an analysis module 502, a provision module 504, a query module 506, and a move module 508. The federation apparatus 500 also includes a cache module 510, a replication module 512, a queue module 514, and a patrol module 516. These modules 502-516, although shown in a single schematic block, may be on a single machine or may be distributed among several machines that are coupled together in one manner or another within a database system 200.

In one embodiment, the analysis module 502 analyzes a data query stream from the client 202 to a database instance 206. The data query stream includes the ongoing data queries from an application on the client 202. In another embodiment, the analysis module 502 also determines if the data query stream exhibits a predetermined performance attribute.

The predetermined performance attribute may be any type of performance attribute that defines the performance of the database system 200, database instance 206, or database 210. For example, in one embodiment, the predefined performance attribute may be the workload balance of the database system 200. In another embodiment, the predefined performance attribute may be a measure of the network delay in the database system 200. In another embodiment, the predefined performance attribute may be recognition of a failure in the database system 200. In another embodiment, the predefined performance attribute may be a measure of the query throughput of a database server 206 within the database system 200. In another embodiment, the predefined performance attribute may be a measure of processor usage of a database server 206 within the database system 200. In further embodiments, the predefined performance attribute may be any measure of the quality of service (QoS) for the user of the database system 200 or, in particular, of a database server 206 or a database 210.

In one embodiment, the provision module 504 provisions a database resource in response to a determination that the data query stream exhibits a given performance attribute. In other words, the provision module 504 provisions a new database resource to improve the performance of the database system 200. In one embodiment, the provisioned database resource may be a database instance 206, such as the database server 306 described with reference to FIG. 3. Alternatively, the provisioned database resource may be a cache, such as the cache 420 described with reference to FIG. 4. In another embodiment, the provisioned database resource may be another database resource that allows the federation apparatus 500 to balance the workload of the database system 200, to avoid failure of a device within the database system 200, to reduce network delays within the database system 200, or to otherwise provide a relatively high performance level for the database system 200.

Depending on the type of database resource that is provisioned, the provision module 504 may provision the database resource on a physical data storage device, within a logical software layer, or on another layer of the database system 200. Additionally, the provision module 504 may provision the database resource locally on the federation apparatus 500 or remotely from the federation apparatus 500. In a further embodiment, the provision module 504 may provision the database resource with reference to the geographic distance or network distance between the client 202 and the provisioned database resource.

In one embodiment, the query module 506 redirects a data query within a data query stream to the provisioned database resource. For example, if the entire logical instance of a database 210 is moved to another database server 206, then the query module 506 redirects all queries for the corresponding database 210 to the provisioned database server 206. Alternatively, if a portion of the physical data from a database 210 has been copied to a cache then the query module 506 redirects all queries for the corresponding data to the provisioned cache.

In one embodiment, the move module 508 transfers an entire database 210 from one database instance 206 to another database instance 206. Alternatively, the move module 508 may transfer a portion of a database 210 from one database instance 206 to another. Allowing a database 210, or portion thereof, to be accessed via a separate database server 206 in this manner may avoid failures of a database server 206 and/or balance out the workload among multiple database servers 206. Moving a logical instance of a database 210 may be relatively fast compared to copying or caching the physical data of the database 210.

In one embodiment, the cache module 510 determines which data within a database 210 might be replicated on a provisioned database resource, such as a cache. For example, the cache module 510 might identify particular rows and columns within a database 210 that are frequently accessed by a particular client 202 or application. Alternatively, the cache module 510 may identify other subsets of a particular database 210 or several databases 210 to be replicated on the cache.

In one embodiment, the replication module 512 copies the specified data from the database 210 to the cache. In another embodiment, the replication module 512 also may ensure that the data on the cache is updated periodically or when the data in the back end database is updated.

In one embodiment, the queue module 514 queues a data query from the data query stream during the time that the move module 508 moves a logical instance of a database 210 from one database server 206 to another database server 206. In a further embodiment, the queue module 514 may queue a data query during the time that the cache module 510 copies data from a database 210 to a cache. Queuing data queries at the federation apparatus 500 advantageously may prevent the client 202 from experiencing a data query failure or becoming aware of the newly provisioned data resource.

In one embodiment, the patrol module 516 captures a copy of every data query in the data query stream. By capturing copies of the data queries, the patrol module 516 may aid the analysis module 502 in analyzing the data query stream. In one embodiment, the data query copies may be stored on an electronic storage device locally or remotely coupled to the federation apparatus 500.

Although certain functional characteristics of each of the modules 502-516 of the federation apparatus 500 have been described in some detail above, the modules 502-516 may be further understood with reference to the following schematic flow chart diagrams. However, the exemplary language employed in describing the following operations is intended to provide only one example of the functionality of the federation apparatus 500 within a database system. The various modules 502-516 of the federation apparatus 500 may perform similar functions alone or in combination with one another or in combination with other modules.

Figure 6:
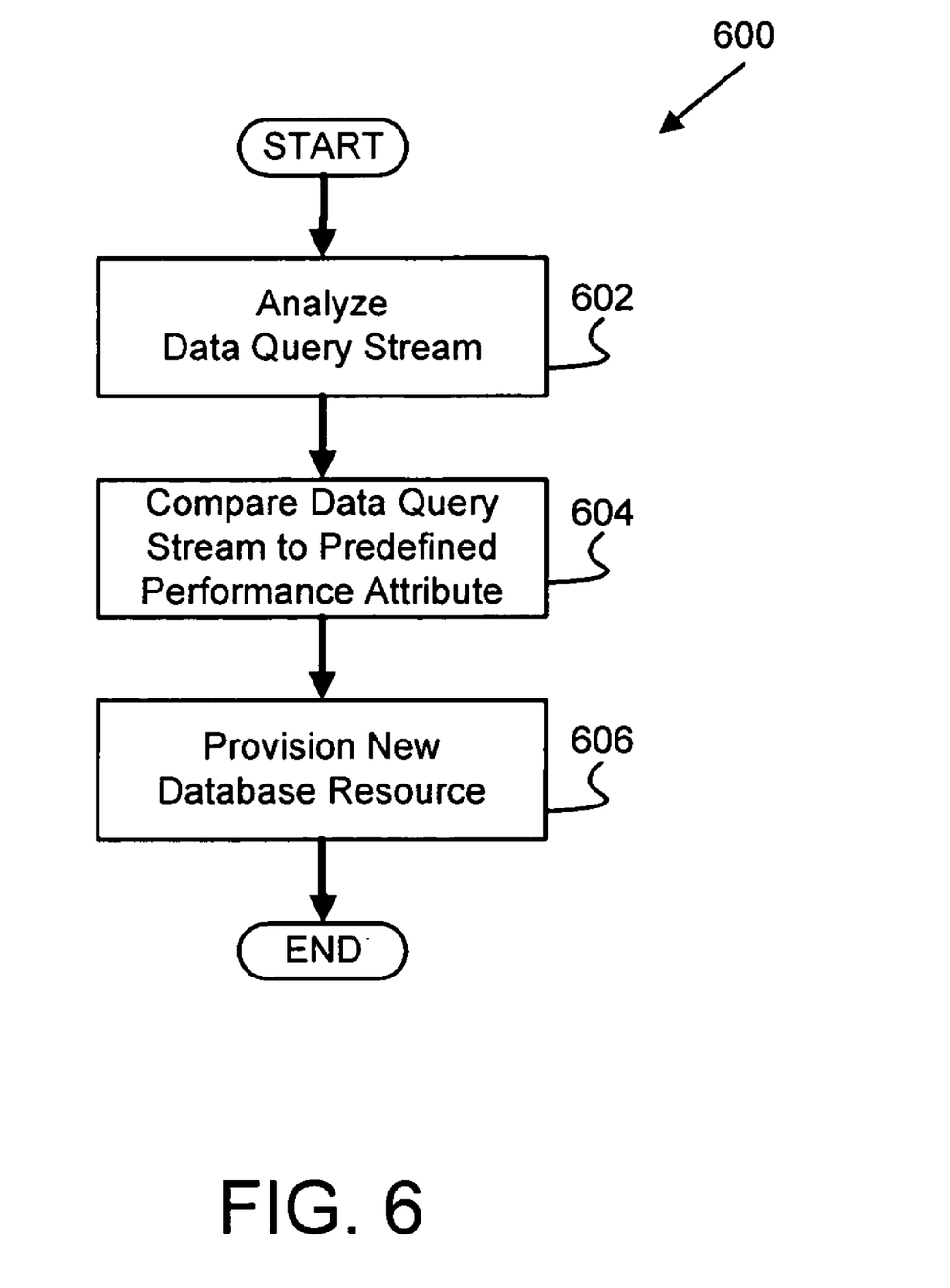
FIG. 6 is a schematic flow chart diagram illustrating one embodiment of a federation method that may be implemented on the database system of FIG. 2.

FIG. 6 depicts one embodiment of a federation method 600 that may be implemented on the database system 200 in conjunction with the federation apparatus 500. The illustrated federation method 600 begins during operation of the database system 200. The analysis module 502 analyzes 602 the data query stream of the client 202. As used herein, analyzing 602 the data query stream refers to measuring a performance level of the database system 200 using one of the performance measurements presented above or a similar performance measurement. The analysis module 502 subsequently compares 604 the data query stream to a predefined performance attribute, as described above. Depending on the determination of the analysis module 502, the provision module 504 may provision 606 a new database resource to be used for future data queries within the data query stream. More detailed examples of the federation method 600 are described with reference to FIGS. 7 and 8.

Figure 7:
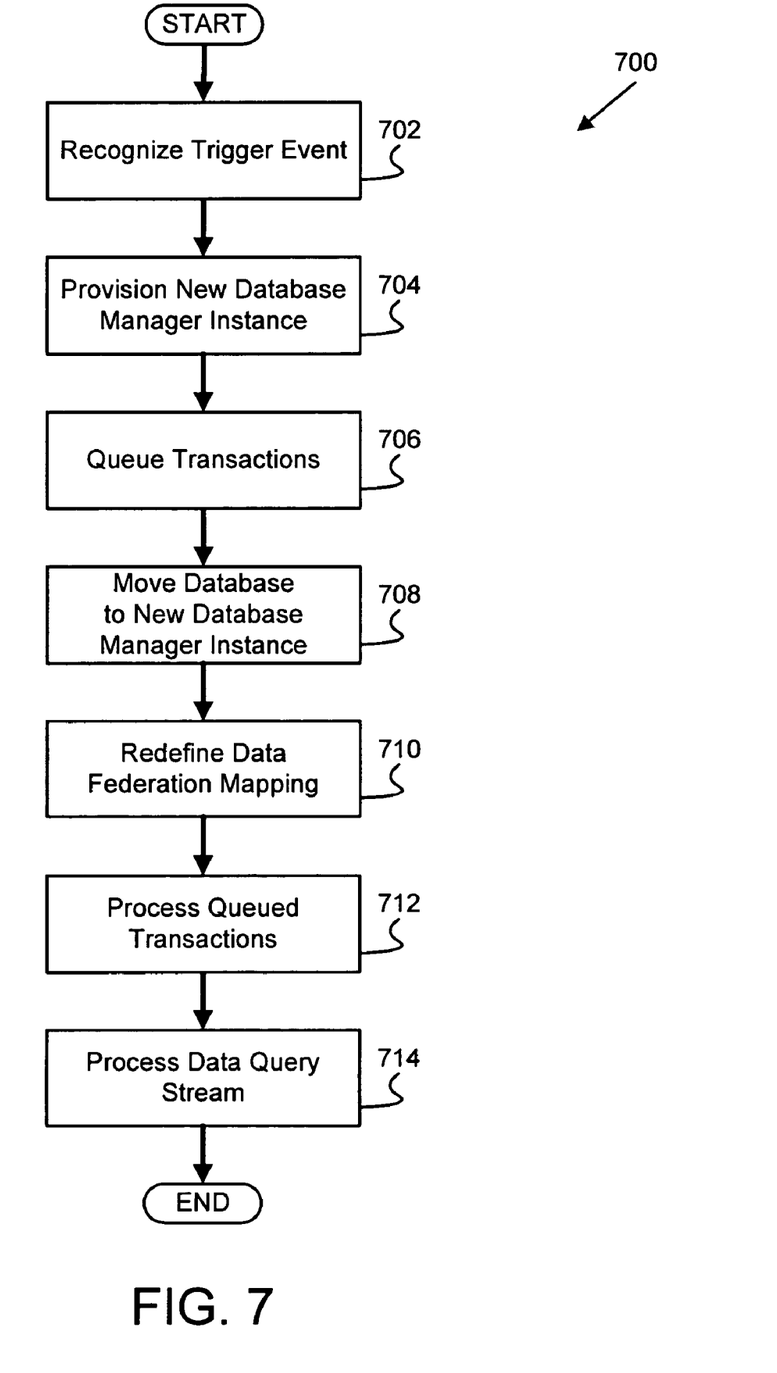
FIG. 7 is a schematic flow chart diagram illustrating another embodiment of a federation method that may be implemented on the database system of FIG. 2.

FIG. 7 depicts an embodiment of another federation method 700 that may be implemented on the database system of FIG. 2. In particular, the federation method 700 is an alternative embodiment of the federation method 600 of FIG. 6. The federation method 700 specifically implements a database move operation 300 as shown in FIG. 3.

The illustrated federation method 700 begins when the federation apparatus 500 recognizes 702 a trigger event, as described above. The provision module 504 then provisions 704 a new database manager instance 206. In preparation for moving the logical instance of the database 210, the queue module 514 queues 706 the current data query transactions in the data query stream and the move module 508 logically moves 708 the database 210 to the new database manager instance 206. Alternatively, the move module 508 may move 708 a portion of the database 210 rather than the entire database 210. In one embodiment, the queue module 514 may allow currently executing transactions to complete while queuing 706 new data query transactions. The federation module 500 then redefines 710 the federation mapping, which defines how the databases 210 are mapped to the database servers 206. In one embodiment, the move module 508 may update 710 the federation mapping.

After the newly provisioned database manager instance 206 is ready to start processing queries, the queue module 514 stops queuing the data queries and the database system 200 processes the queued data queries. The database system 200 also processes 714 the other data queries within the data query stream. The depicted federation method 700 then ends.

Figure 8:
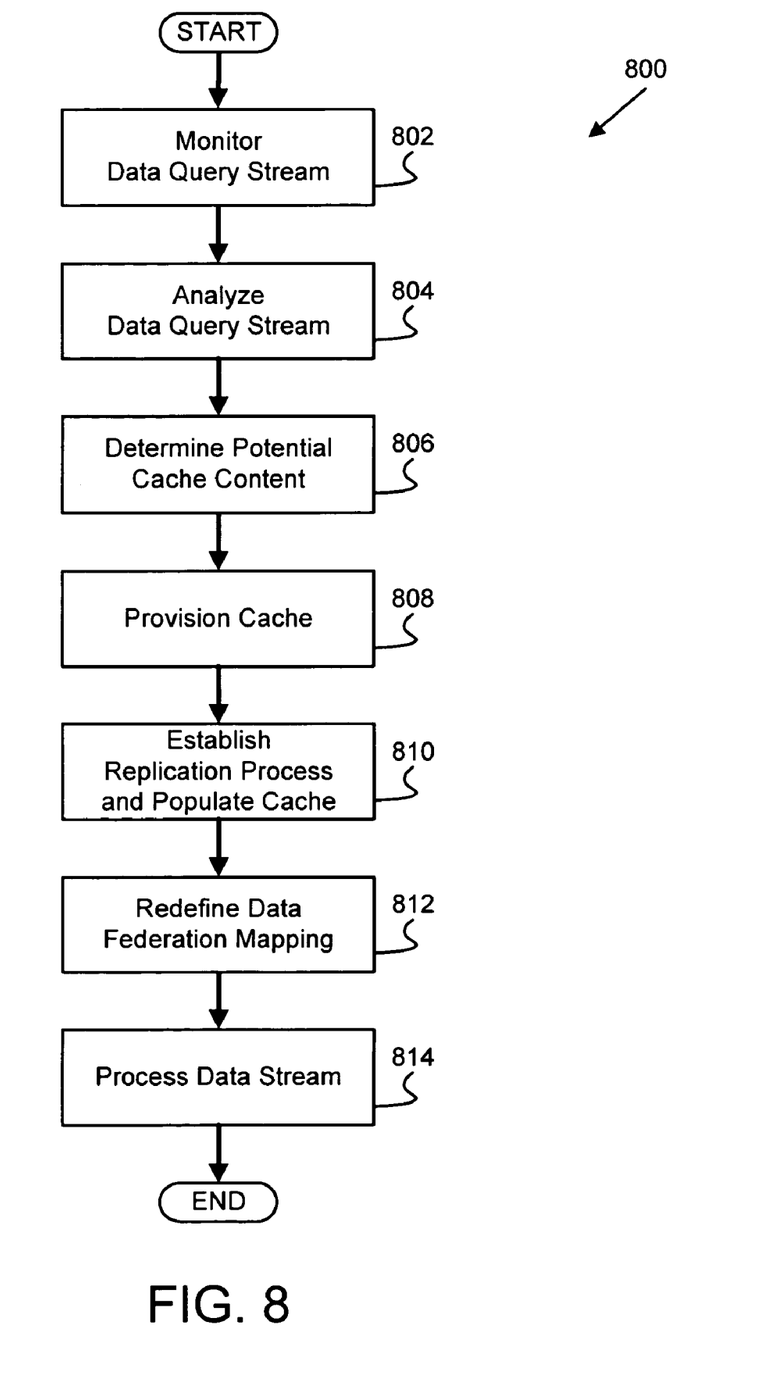
FIG. 8 is a schematic flow chart diagram illustrating another embodiment of a federation method that may be implemented on the database system of FIG. 2.

FIG. 8 depicts an embodiment of another federation method 800 that may be implemented on the database system of FIG. 2. In particular, the federation method 800 is an alternative embodiment of the federation method 600 of FIG.

6. The federation method 800 specifically implements a database cache operation 400 as shown in FIG. 4.

The illustrated federation method 800 begins during operation of the database system 200. The analysis module 502 monitors 802 the data query stream from the client 202. In one embodiment, the analysis module 502 may employ the patrol module 516 to capture copies of all of the individual data queries in the data query stream. The analysis module 502 then analyzes 804 the data query stream and determines 806 which data should be replicated on a cache. In one embodiment, analysis module 502 may wait for a certain period of time or until a certain number of data queries have been received before analyzing 804 the data query stream.

The provision module 504 then provisions 808 a new cache. In association with the provision module 504, the replication module 512 establishes a replication process and populates 810 the cache with the data from a selected database 210. The federation module 500 then redefines 812 the federation mapping for the database system 200. In one embodiment, the cache module 510 may update 812 the federation mapping. The database system 200 then processes 814 the data queries within the data query stream and the depicted federation method 800 ends. In one embodiment, the replication process established by the replication module 512 may be used to keep the data in the cache consistent with the data in the source database 210.

Advantageously, the provisioning of new database resources using the federation apparatus 500 is substantially transparent to a client 202 on the database system 200. As described above, the federation apparatus 500 is configured to provision one or more new database resources without making the client 202 experience a query failure. Although a delay may be apparent to the client 202, the federation apparatus 500 may allow the client 202 to substantially continue operations without awareness of the newly provisioned database resources.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A centralized federation apparatus implemented on a processor and a memory, the centralized federation apparatus for provisioning database resources, the centralized federation apparatus comprising:

an analysis module that analyzes a database query stream from an application to a database instance in real time, the database instance comprising a logical representation of a database and returning a result set in response to a database query from the database query stream, the database comprising physical data stored on a storage device;

the analysis module further determines that the database query stream exhibits a predetermined performance attribute;

a provision module that assigns a database resource selected from the group consisting of a second database instance stored in computer readable memory, a database server, and a cache stored in computer readable memory in response to a determination that the database query stream exhibits the predetermined performance attribute;

a move module that transfers at least a portion of the database instance to the assigned database resource such that the transfer is transparent to a client, wherein the portion of the database instance comprises metadata and structural configuration data for operating one of the second database instance, the database server, and the cache defined by the assigned database resource; and a query module that redirects one or more database queries from the database query stream to the assigned database resource, the assigned database resource assigned in response to a value for the predetermined performance attribute of the database query stream crossing a predetermined threshold.

2. The centralized federation apparatus of claim 1, further comprising a queue module coupled to the move module, the queue module queueing at least one database query from the database query stream substantially concurrently with the transfer of the database instance.

3. The centralized federation apparatus of claim 1, wherein the provision module further assigns the database resource locally to the centralized federation apparatus.

4. The centralized federation apparatus of claim 1, wherein the provision module further assigning the database resource remotely from the centralized federation apparatus.

5. A system for provisioning database resources, the system comprising:
- a first database resource having data;
- an application that generates a database query to be submitted to the first database resource;
- a centralized federation apparatus coupled between the first database resource and the application, the centralized federation apparatus provisioning a second database resource and redirecting the database query to the second database resource, the centralized federation apparatus comprising a processor and a memory;
- an analysis module that analyzes a database query stream from an application to a database instance in real time the database instance comprising a logical representation of a database and returning a result set in response to a database query from the database query stream, the database comprising physical data stored on a storage device;
- the analysis module further determines that the database query stream exhibits a predetermined performance attribute;
- a provision module that assigns a database resource selected from the group consisting of a second database instance stored in computer readable memory, a database server, and a cache stored in computer readable memory in response to a determination that the database query stream exhibits the predetermined performance attribute;
- a move module that transfers at least a portion of the database instance to the assigned database resource such that the transfer is transparent to a client, wherein the portion of the database instance comprises metadata and structural configuration data for operating one of the second database instance, the database server, and the cache defined by the assigned database resource;
- a queue module coupled to the move module, the queue module that queues at least one database query from the database query stream substantially concurrently with the transfer of the database instance such that a database query failure is avoided and the transfer is transparent to a client; and
- a query module that redirects one or more database queries from the database query stream to the assigned database resource, the assigned database resource assigned in response to a value for the predetermined performance attribute of the database query stream crossing a predetermined threshold.

6. The system of claim 5, further comprising a patrol module coupled to the analysis module, the patrol module capturing a copy of at least one of the database queries in the database query stream.

7. The system of claim 6, further comprising a cache module and a replication module coupled to the analysis module, the cache module determining a portion of the first database resource to be cached, the replication module caching the determined portion on the second database resource.

8. The system of claim 5, further comprising a storage area network (SAN) to which the first and second database resources are coupled.

9. The system of claim 5, further comprising a queue module coupled to the move module, the queue module queueing, at least one database query from the database query stream substantially concurrently with the transfer of the database instance.

10. The system of claim 5, wherein the provision module further assigns the database resource locally to the centralized federation apparatus.

11. The system of claim 5, wherein the provision module further assigns the database resource remotely from the centralized federation apparatus.

12. A computer implemented method for provisioning database resources, the method-comprising:
- analyzing, by a centralized federation apparatus, a database query stream from an application to a database instance in real time, the database instance comprising a logical representation of a database and returning a result set in response to a database query from the database query stream, the database comprising physical data stored on a storage device;
- determining, by the centralized federation apparatus, when the database query stream exhibits a predetermined performance attribute;
- assigning, by the centralized federation apparatus, a database resource selected from the group consisting of a second database instance stored in computer readable memory, a database server, and a cache stored in computer readable memory in response to a determination that the database query stream exhibits the predetermined performance attribute;
- replicating a portion of a database from the database instance to the assigned database resources;
- transferring at least a portion of the database instance to the assigned database resource such that the transfer is transparent to a client, wherein the portion of the database instance comprises metadata and structural configuration data for operating one of the second database instance, the database server, and the cache defined by the assigned database resource; and
- redirecting one or more database queries from the database query stream to the assigned database resource, the assigned database resource assigned in response to a value for the predetermined performance attribute of the database query stream crossing a predetermined threshold.

13. The method of claim 12, further comprising updating the replicated data in a cache in response to an update to the database instance.

14. The method of claim 12, further comprising determining the portion of the database instance to be replicated on the assigned database resource.

15. The method of claim 12, wherein assigning further comprises assigning the database resource locally to the centralized federation apparatus.

16. The method of claim 12, wherein assigning further comprises assigning the database resource remotely from the centralized federation apparatus.

* * * * *